UNITED STATES PATENT OFFICE.

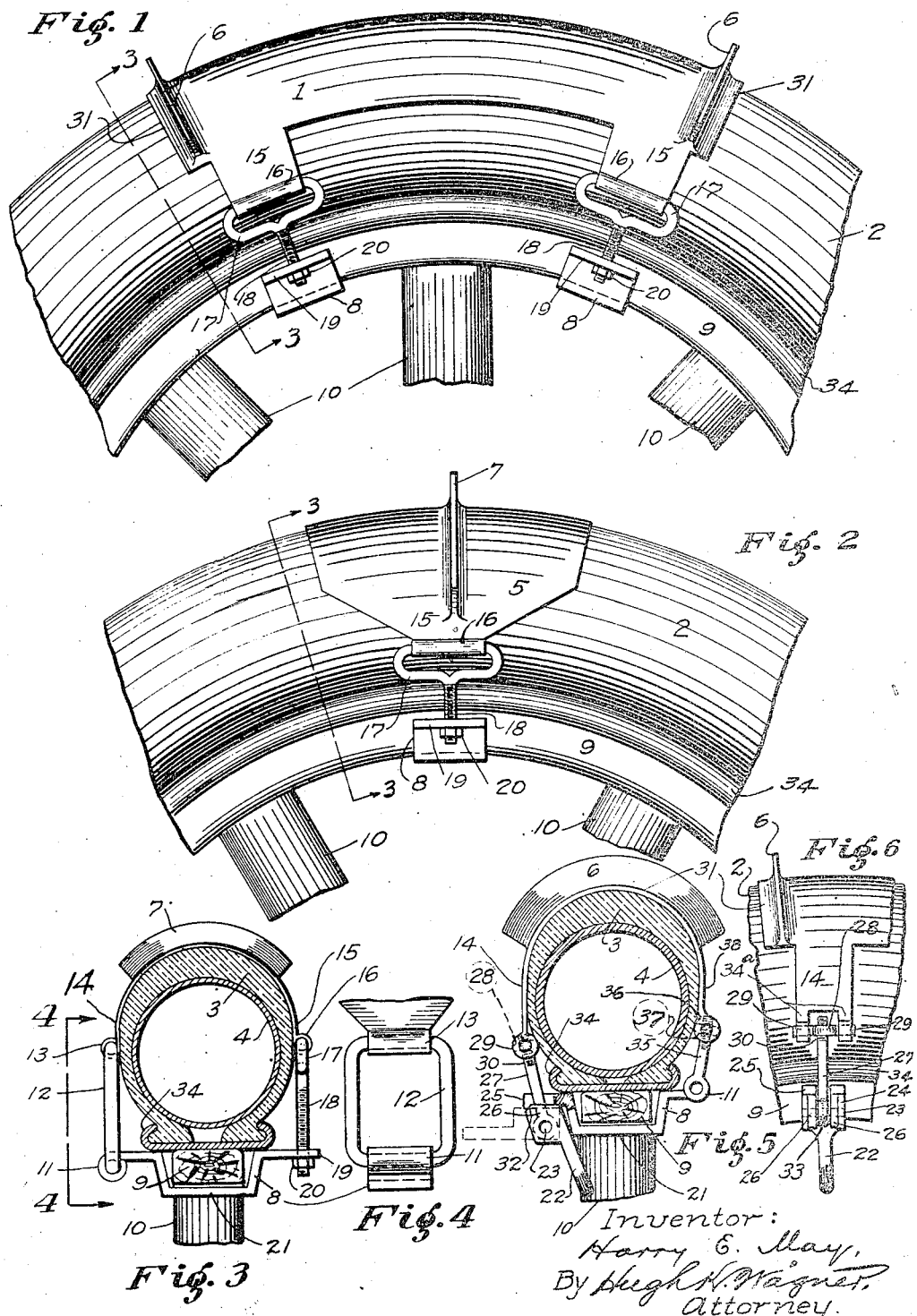

HARRY E. MAY, OF SEDALIA, MISSOURI, ASSIGNOR OF ONE-THIRD TO HOLMES HALL, OF SEDALIA, MISSOURI, AND ONE-THIRD TO HUGH K. WAGNER, OF ST. LOUIS, MISSOURI.

MUD-HOOK.

1,272,291.   Specification of Letters Patent.   Patented July 9, 1918.

Application filed September 19, 1917. Serial No. 192,047.

*To all whom it may concern:*

Be it known that I, HARRY E. MAY, a citizen of the United States, residing at the city of Sedalia, in the county of Pettis and State of Missouri, have invented certain new and useful Improvements in Mud-Hooks, of which the following is a specification.

This invention consists of what is termed a mud hook for vehicle wheels, particularly those of the different kinds of motor vehicles, including trucks. The object of this invention is to provide a construction that will have a longer bearing surface than is found in prior mud hooks upon the periphery of the wheel and that will be easier to apply and remove than those now on the market. The conditions under which mud hooks are applied are usually those of great discomfort on account of mud or water in the road and also on account of the fact that a wheel or the wheels may be sunken hub deep in mud, water, sand or the like. This being the case, mud hooks depending upon tapes, cords, straps or the like or upon buckles for fastening, are likely not to be drawn into as tight engagement with the tire as even such means make possible and it is impossible to draw them into as tight engagement as is easily effected by means of this device. When a mud hook is not attached with the utmost rigidity to a tire, not only is its efficiency for the purpose for which it is intended decreased, but by reason of its being allowed to rock or wabble it is likely to cause injury to the tire. This is prevented by the present invention.

Heretofore mud hooks have been made too narrow in their base plates that transversely cross the tire and this has rendered it practically impossible to derive from them the necessary efficiency or to keep them from rocking or wabbling. The present device is so elongated as to present an adequate bearing surface upon an adequate longitudinal bearing surface along the circumference of the tire to obviate both these difficulties. So easy and convenient of application to the wheel is the present device that it can be attached while the person doing so stands or kneels on the running-board of the car.

The strain put upon mud hooks is very great and in actual practice it has been found that those that depend upon cords or straps of any kind, even stout leather straps, are rendered useless by the breaking of the cords or straps or similar attaching means. Thus a motorist equipped with mud hooks to be attached by straps or the like, upon finding need for the use of the same, attaches them with great difficulty, endeavors to drive out of the mud hole in which his driving wheels have been caught, breaks the mud hook straps, and usually not having an extra supply finds his vehicle still stalled in the mud. If he has extra straps he will usually break several sets and may still find his car stalled.

One advantage of easily attachable and detachable mud hooks is that when a driver sees a stretch of sandy or muddy road ahead of him he is more likely to attach the mud hooks than to take a chance, whereas if they are of ordinary types, hard to apply, he will more likely take a chance and try to get through, resulting in becoming actually stuck, which, as is well known, is a condition much harder to get out of than it would have been to keep going, as would have been possible if the easily attachable and detachable mud hooks had been at hand and used.

In the accompanying drawings forming part of this specification and in which like numbers of reference denote like parts wherever they occur, Figure 1 is a fragmental side elevation of part of a vehicle wheel having a pneumatic tire and showing one form of this invention attached thereto;

Fig. 2 is a similar view showing another form of this invention in place upon a vehicle wheel;

Fig. 3 is a sectional view on the line 3—3 in Figs. 1 and 2, looking in the direction of the arrows;

Fig. 4 is a detailed view of a link and connected parts taken on the line 4—4 of Fig. 3;

Fig. 5 is a sectional view like Fig. 3, but showing a modified form of attaching means;

Fig. 6 is a fragmental side elevation of the subject-matter of Fig. 5; and

Figure 7:
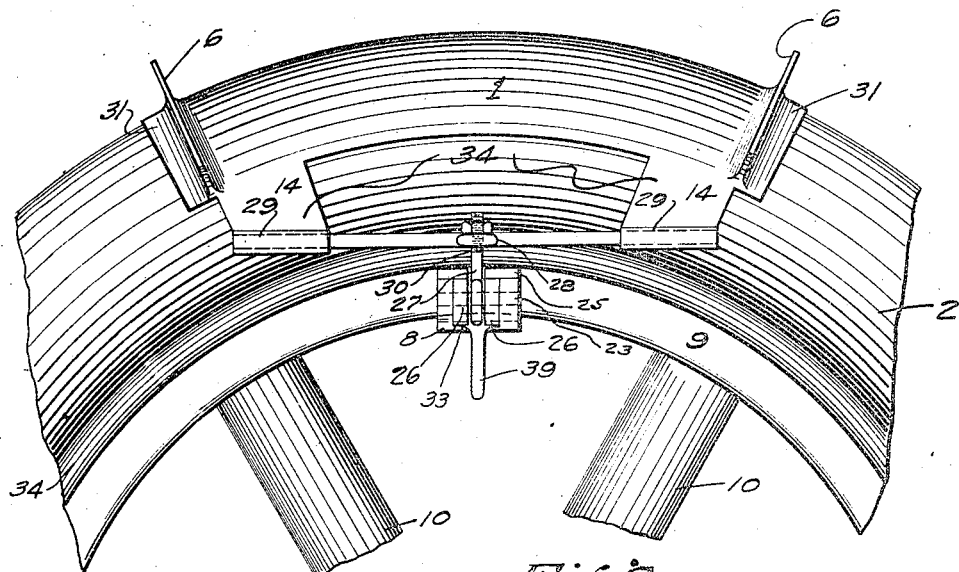
Figs. 7 and 8 are opposite side elevations of a modification.

The plate 1 is not only elongated, as clearly shown in Fig. 1, but is also curved in its shape in cross section and so shaped in cross section as to be adapted closely to fit the contour of the tire 2 to which it is applied. This tire need not necessarily be of the pneumatic variety, having the casing 3 and inner tube 4 shown in the drawings, but may be of hard rubber or of any other kind.

In the modification shown in Fig. 2 it will be observed that the plate 5 is elongated in the same manner as plate 1 in Fig. 1 and that plate 5 also is suitably shaped to fit the exterior contour of the tire 2. Whatever the shape of the tire, the mud hooks will give the best service if their shape approximately conforms to the shape of the outside periphery of the tire, both laterally and longitudinally. It will be observed that both plate 1 and plate 5 are curved longitudinally as well as transversely.

The larger the car, the larger the wheels and tires, and vice versa for smaller cars. Accordingly the device of Fig. 1 is intended more particularly for large and heavy cars where the maximum strength and efficiency of mud hook is required, while the device of Fig. 2 is, generally speaking, intended more for smaller cars.

Traction-making ribs 6 project from plate 1 and are arranged at substantially a right angle to the tread of tire 2. Mud hooks are required when the constituency of the road is such that the ordinary tread of the tire 2 does not get traction, i. e., take hold on the road, and this may be due either to the presence of mud or sand or some other non-stable or loose condition. The ribs 6 are adapted to bite the road, no matter of what its consistency, because they present a greater transverse bearing surface to gather up road material for a bite, or in the case of loose material upon top of firmer ground, they cut through the firmer ground and bite into it instead of slipping over it as would be the case of the ordinary tire tread.

While the drawings illustrate only a pair of transverse ribs 6 in the form depicted in Fig. 1 and a single rib 7 in the form shown in Fig. 2, yet any desired number of ribs may be used in either of these devices and the said ribs may be formed integral with plates 1 or 5, as where the whole is cast or pressed or stamped, or they may be formed as separate pieces riveted or otherwise attached to plates 1 or 5.

The shackle 8 is passed inside the felly 9 of the wheel at a point between a pair of spokes 10 after the plate 1 (or plate 5) has been placed upon the tire 2 in the position shown in Figs. 1 and 2.

At one end of the shackle 8 is formed an eye 11, in which is swiveled a link 12 which is swiveled in a similar eye 13, preferably formed integral with a lug 14 on plate 1 (or plate 5 in Fig. 2).

Upon the other side of plate 1 is a similar lug 15 terminating in an eye 16 to which is swiveled the slotted head 17 of bolt 18, which bolt 18 passes through a bolt hole in the end 19 of shackle 8. A nut 20 draws upon bolt 18 in such manner as to bind the ends of shackle 8 tightly to the rim 34 and to produce the maximum tightness of engagement of plate 1 (or plate 5 of Fig. 2) with tire 2. A wrench applied to nut 20 will produce as great tightness of binding of the mud hook to the tire and rim as may be desired.

It will be observed that the central part 21 of the shackle 8 is bent out of the plane of the ends of the shackle that carry the eye 11 and the bolt hole for bolt 18, whereby the central part 21 clears engagement with the felly 9. By the said bending of shackle 8 the central part 21 clears the felly 9 while the ends of shackle 8 engage the under side of rim 34, which is clearly a very advantageous arrangement.

The swiveling of parts in eyes 11, 13 and 16 produces a flexibility of the device as a whole that compares favorably with the flexibility of mud hooks dependent upon straps and the like for adjustment, while on the other hand the use of metal in the construction of all the parts hereinbefore described makes this device of unusual strength and one that will stand and efficiently serve through any power that can be applied by the engine without causing slipping of the clutch.

The construction of the device as shown in Figs. 5 and 6 is largely the same as hereinbefore described, the chief difference being that power for drawing the ribbed bearing plate and the shackle 8 together instead of being applied by nut 20 is applied by hand lever 22, which is pivoted at 23 in a fork 24 dependent from the slotted end 25 of shackle 8 opposite the end of the said shackle having the eye 11. The pivot 23 for the enlarged end 26 is off center so that the said enlarged end 26 acts as a cam when the said lever is moved from the position shown in dotted lines in Fig. 5 to a position shown in full lines in the same figure, which cam-like action causes the said pivot to draw bolt 27 in threaded connection with eyelet 28 swiveled in eyes 29 in lug 14 downwardly, thus binding shackle 8 to rim 34 and the rib-bearing plate to the tire 2.

The threads 30 on bolt 27 engage with internal threads in eyelet 28, which allows for any adjustment that may be necessary on account of variation of size of tire or felly or other parts, in order to secure the tightest engagement of all the parts in actual use.

It has been found in actual practice with previous forms of mud hooks that a single rib on a mud hook sometimes fails to extricate a car for the reason that it loses its traction or bite upon the road material before the extrication of the vehicle is completed, for which reason it will be perceived that one rib following another, as shown in Fig. 1, will be of great advantage.

For the sake of added strength, the ribs 6 in Fig. 1 rise from between the main body of the plate 1 and an extension 31 therefrom.

The nose 32 on the underneath side of the part 25 holds the lever 22 in the position shown in full lines in Fig. 5.

Bolt 27 is at its shackle end provided with the eye 33, through which the pivot 23 passes by means of which the enlarged end or cam 26 of lever 22 is pivoted to fork 24, and thus bolt 27 is in pivotal connection with the cam 26.

In Figs. 5 and 6 the eyes 29 are formed in the opposite parts of fork 34$^a$ projecting from lug 14.

In the construction shown in Figs. 5 and 6, but appearing only in Fig. 5 of the drawings, the bolt 35 is shown in threaded engagement with an eyelet 36 which is pivoted in eyelets 37 in the branches of the fork 38, the said bolt 35 and the parts just described being on the opposite side of the tire from bolt 27. This provision for adjustment of both sides of the tire is an advantage in making it possible to adjust the same to any size of tire or demountable rim of felly without making all the parts as large as would be necessary without this double provision for adjustment. This provision for adjustment on both sides also possesses the advantage of allowing the device to be used in connection with tires and other parts of various sizes without distortion of the device or distortion of its pull upon the tire, rim, etc.

Figure 8:
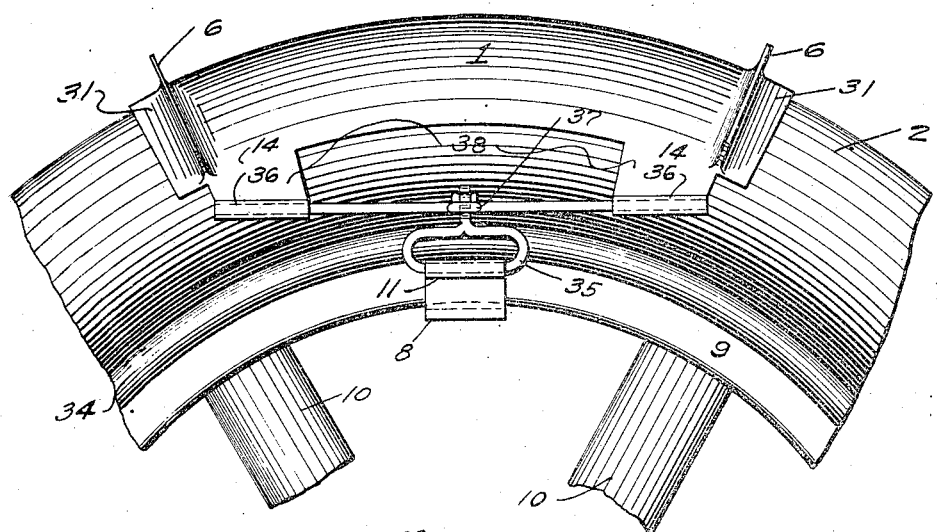

In the modification illustrated in Figs. 7 and 8, all the parts are substantially as shown in Figs. 5 and 6, but the difference is that whereas Figs. 5 and 6 require a lever 22 at each end of the plate 1, the modified form shown in Fig. 7 is so constructed that one lever 39 performs the function of both.

Having thus described this invention, it is obvious that many minor changes in the form, arrangement and order of parts and their materials and mode of construction may be made, without departing from the spirit of this invention or the scope of the following claim.

I claim:

In a mud hook, a body portion adapted to embrace a wheel tire, a link pivotally connected to one side of said body portion, a shackle constructed to embrace the felly of a wheel, a laterally extending lug at one end of the shackle to which the said link is secured, the other end of the shackle being slotted, and a fork integral with the slotted end of said shackle, a lever having an enlarged end pivoted in said fork centered for cam action, whereby the enlarged end of the lever acts as a cam when the lever is moved, a draw bolt connected at one end to one side of said body and having its other end mounted on the pivot of the cam head of said lever.

In testimony whereof I hereunto affix my signature.

HARRY E. MAY.